United States Patent Office 3,540,966
Patented Nov. 17, 1970

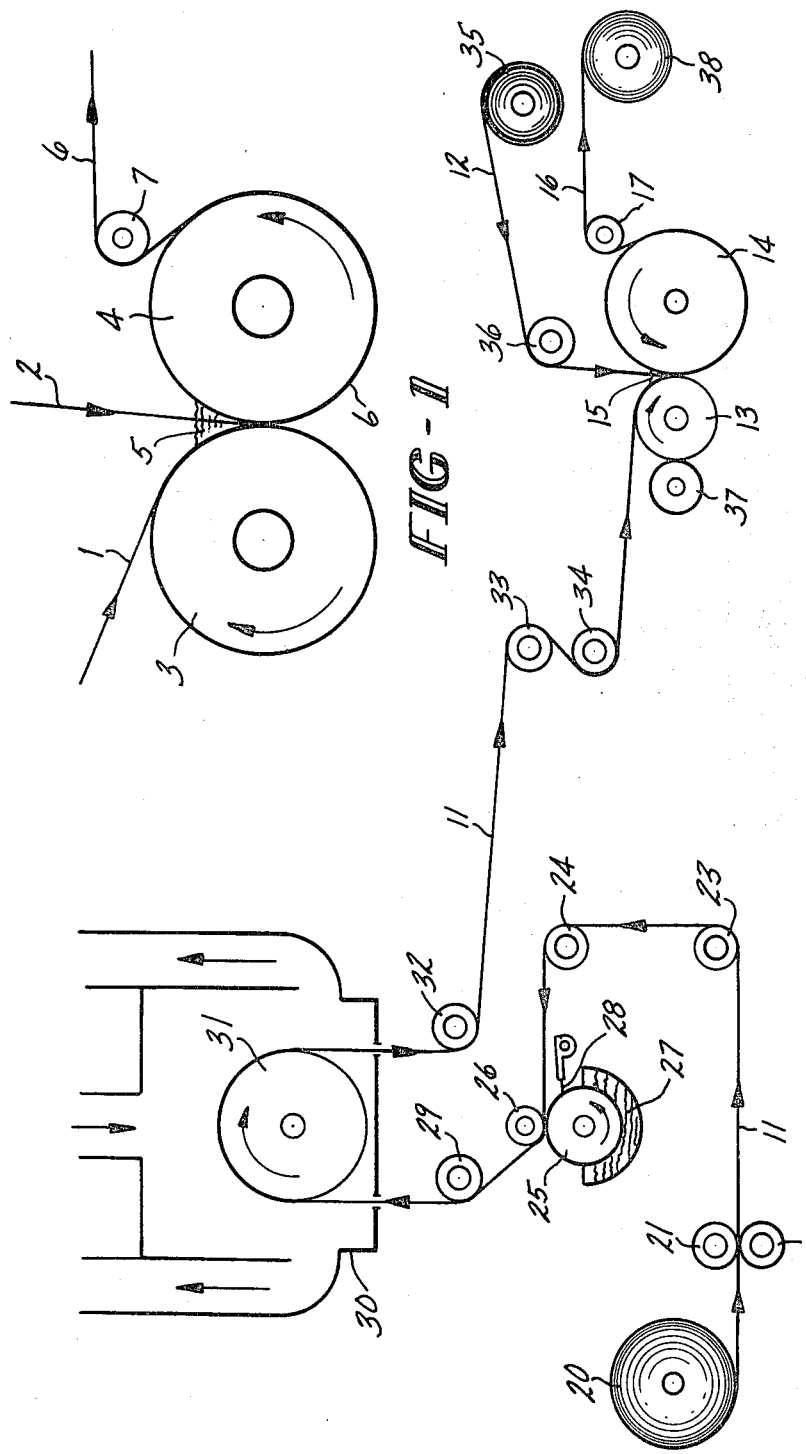

3,540,966
PROCESS FOR LAMINATING FILMS
Paul W. Baker and Edward J. Retzer, Brevard, N.C., assignors to Olin Mathieson Chemical Corporation, a corporation of Virginia
Filed July 10, 1967, Ser. No. 652,080
Int. Cl. C09j 5/02
U.S. Cl. 156—307                                     7 Claims

ABSTRACT OF THE DISCLOSURE

Polymer-coated flexible films, for example layers of cellophane coated with a vinyl polymer or copolymer, such as a copolymer of vinylidene chloride and acryonitrile, are laminated by an improved process whereby the resulting composite film displays unusual clarity and the initially separate layers are strongly bonded. A shallow pool of water, or other liquid, is maintained between a pair of heated laminating rolls and the films are united at the nip therebetween, one of the films being conducted downwardly through the pool and the other being carried by one of the rolls so that a surface contacts the pool. For high speed lamination, the latter surface is preferably provided with a coating of adhesive prior to lamination at the roll nip.

BACKGROUND OF THE INVENTION

This invention relates to the lamination of films and particularly to an improved process for producing strongly-bonded composite films, characterized by a simplified procedure and ease of control of the operation and by enhanced optical clarity and other desired physical qualities of the product.

While various procedures for laminating flexible films have been used or proposed heretofore, they have been deficient or disadvantageous in a number of respects. Generally, the resulting laminated film product was far less transparent than either of the starting films. Also, due to the need for subjecting the film to elevated temperatures, accompanied by the evaporation of moisture therefrom, the bonding process too often resulted in a product of inadequate durability which also displayed troublesome curling tendencies.

Such difficulties of the manufacturing procedure or of the resulting product have now been overcome or eliminated by the present invention.

SUMMARY OF THE INVENTION

In accordance with the persent invention, generally stated; a polymer-coated flexible film is laminated to another film, which may be similar to the first or of different composition, by conducting the films downwardly and separately through a pool of liquid, preferably water, maintained above the nip of a pair of heated laminating rolls, then through the said roll nip to bond the films with the exclusion of air, and completing the bond by maintaining the united films in contact with a heated roll beyond the nip. The resulting composite film product is thereby formed readily, without need for a series of complicated steps, and is characterized by combined layers which are strongly bonded together and display enhanced optical clarity.

It is essential to provide that one of the films being laminated is carried forward to the laminating nip with one film surface maintained in contact with a laminating roll and the opposite film surface contacting the pool of liquid above the nip. This mode of operation enables the preservation of slip or release ingredients in the film surface which are essential for the proper functioning of the composite film product on packaging machines. It is likewise essential that the other film be passed through the pool above the nip, with both surfaces being contacted by the liquid, in order to insure against the retention of sufficient slip of release agents in these surfaces either to cause any impairment of the lamination bond or of subsequent heat seal bonds. Sufficient liquid is then retained between this film and the heated roll to act as release agent, thus preventing any sticking of the composite film to the hot roll.

As the films travel downwardly through the pool of water or other liquid above the roll nip, air or other gas which is present on or between the film surfaces is displaced by the liquid and escapes into the atmosphere above the rolls. In the absence of the pool of liquid, minute bubbles of air or gas remain trapped between the film surfaces and tend to impart a cloudy appearance to the laminate. In contrast, films laminated in accordance with this invention present a sparkling clear appearance due to the absence of gas bubbles and also partly because of the elimination of some scratches and blemishes which were initially persent on the film surfaces. Thus, the composite film product of this invention is always at least as clear as the starting films and generally of improved clarity.

The present laminating method is particularly adapted for the lamination of two layers of polymer coated cellophane to form a composite film of high quality. The polymer coating is advantageously applied to both surfaces of the initial films. Preferably, the coating layers consist of a thermoplastic vinyl polymer or copolymer, for example, a copolymer formed by polymerizing vinylidene chloride with one or more vinyl monomers such as acrylonitrile, alkyl acrylate or methacrylate, or vinyl chloride as described in U.S. Pat. No. 2,570,478. The regenerated cellulose base film may be prepared by the viscose or cuprammonium processes, and may be replaced by other clear flexible films such as of methyl or ethyl cellulose or of hydroxyethyl or hydroxypropyl cellulose as well as by transparentized or translucent paper, for example glassine. Also, the base film may consist of a polyolefin, such as polyethylene or polypropylene, or a polyester, for example poly (ethylene terephthalate). Whether the base film consists of a cellulosic or other base, a polymeric coating as described above is applied over both surfaces thereof.

Any of the above-described coated films can be advantageously laminated in accordance with this invention to a film of the same or different composition or to an uncoated polyvinyl film such as a film of polyethylene, of vinylidene chloride copolymer, or of polypropylene.

DESCRIPTION OF THE DRAWINGS

The accompanying drawings are diagrammatic illustrations of the laminating process of this invention.

FIG. 1 is a diagrammatic illustration of the basic laminating step in accordance with the invention.

FIG. 2 is a diagrammatic illustration of a preferred embodiment in accordance with the invention.

Referring to FIG. 1, the starting films 1 and 2 are advanced through the nip of rolls 3 and 4, after traversing the liquid pool 5 above said nip. After being laminated at the nip, the composite film 6 is maintained in contact with roll 4 to complete the bonding, then passes over transfer roll 7 to a wind-up roll, not shown.

Roll 3 is a roll provided with a resilient surface or cover, for example of rubber, and is maintained at a desired regulated pressure against roll 4. The latter is an internally heated metal roll having a highly polished surface, for example a highly polished chromium-plated surface maintained at a temperature of 180° to 212° F. A pool 5 of water, or other suitable liquid which is a nonsolvent for the films under treatment, is maintained above the nip between the rolls, having a depth of about a quarter of an inch to several inches. The pool 5 is advantageously maintained by pressing a suitable flat piece of plastic, such as "Teflon," against the opposite ends of the rolls, continuously flowing a small stream of water into the nip and permitting the excess to overflow. The pool of liquid and also roll 3 are maintained at an elevated temperature by means of hot roll 4. The latter is a driven roll and causes the rotation of roll 3, as the rolls are maintained in contact under suitable pressure.

In operation, the initial films 1 and 2 are conducted downwardly into contact with pool 5, which quickly heats their surfaces to a softening temperature and causes the evolution of air and gases therefrom into the atmosphere above. At the same time, the films absorb a small but significant percentage of water. Further downward passage of the films into the roll nip is accompanied by their bonding to form composite film 6. The bond is strengthened during continued contact of the film with the surface of hot roll 4 and the composite film product 6 is then passed over roll 7 to the wind-up roll.

Film 1 consists of a polymer-coated cellophane or other base film, as above described. As shown in FIG. 1, one surface of this film is contacted with pool 5 while the other surface is maintained against roll 3, away from the liquid. This precaution insures the retention of slip or release agents commonly used in polymeric coatings for wrapping films, such as one or more of the following: sodium lauryl sulfate, ammonium lauryl sulfate, stearic acid, carnauba wax, talc or other finely divided mineral silicates.

In order to obtain higher bond strengths, particularly at high laminating speeds of over 250 or 300 feet per minute, the bonding surface of film 1 should advantageously be provided with a heat-activated adhesive coating. Any suitable adhesive of this type may be used, but excellent results have been obtained with the use of polyethyl acrylate and particularly with two-part urethane type adhesives wherein a catalyst solution is mixed with the urethane solution just prior to application.

Film 2 may consist of a film identical or similar in composition to film 1 or it may consist of a polymer-coated film of a different cellulosic or other base. Furthermore, film 2 may consist of an uncoated polyvinyl film, for example, polyethylene, "Saran" (vinylidene chloride copolymer), or polypropylene.

The process as above described is advantageously operated at laminating speeds ranging from about 50 to 500 feet per minute, preferably at 200 to 300 feet per minute. Liquid pool 5 should be maintained at a temperature of about 180° to 212° F. and preferably at 195° to 210° F. The laminating rolls should be urged together at a constant regulated pressure within the range of about 20 to 200 pounds per lineal inch, preferably of 50 to 60 pounds per lineal inch.

Laminating operations within the above stated limits have resulted in excellent composite films, wherein the laminating bond was found to yield a measured value of at least 300 grams per inch, as determined on an Instron tensile tester at a head speed of 12 inches per minute.

In order to obtain improved bonding, particularly at high rates of lamination, one or more rubber-covered press rolls may be arranged between the laminating nip and the take-off roll 7 to apply additional desired pressure on the composite film 6 against the surface of roll 4.

PREFERRED EMBODIMENT

Referring to FIG. 2 of the drawing, illustrating a preferred embodiment in accordance with the invention, the flexible films being laminated are initially separate layers 11 and 12, each consisting of cellophane coated on both surfaces with a vinylidene chloride-acrylonitrile copolymer containing 85% to 95% of vinylidene chloride.

Film 11 is unwound from roll 20 and is conducted in the direction indicated by arrows between rolls 21 and 22 and over rolls 23 and 24. A suitable adhesive is applied to the surface, subsequently to be bonded to form the composite film, by passing film 11 between gravure roll 25 and press roll 26, at a desired controlled pressure. Roll 25 is rotated in a bath 27 of adhesive solution or suspension, the excess being removed by means of doctor blade 28. The bath 27 may desirably consist of a 5% to 10% solution of polyethyl acrylate, or other polymeric adhesive, in ethyl acetate. Excellent results have been secured by using a two-part urethane adhesive, for example "Adcote 5353–114D" from Morton Chemical Co., to the extent that 0.2 to 2 pounds of the polymeric adhesive are applied to 3,000 square feet of film surface. The surface to which the adhesive is applied may if desired carry suitable printed indicia or decorative matter.

The treated film is then conducted over roll 29 through a high velocity dryer 30, wherein volatile solvent is evaporated by the action of hot air, circulated as indicated by the arrows, on the film as it travels over roll 31. The adhesive-coated film 11 is then conducted over rolls 32, 33 and 34 to the laminating station. The same station also receives film 12 from unwind roll 35 after passage over transfer roll 36.

The laminating station consists of rubber-covered roll 13 forming a nip with the highly-polished chromium-plated roll 14, which is internally heated, and the liquid pool 15 maintained above the nip, as described above with respect to FIG. 1. The nip between rolls 13 and 14 is maintained through a desired controlled pressure applied by back-up pressure roll 37.

The nip pool 15 has a depth of one-quarter inch to several inches, preferably about one inch, of water maintained at a temperature of 180° F. to the boiling point, preferably at 195° to 210° F.

As shown, film 11 is tightly wrapped against the roll 13 as it is conducted through the pool 15, so that the release ingredients in the coating are not washed off. This is essential because such release ingredients enable the heat sealing of the subsequently obtained composite film on packaging machinery without sticking of the film to the sealing jaws. In contrast, film 12 must be threaded into the nip so that water in pool 15 is maintained between the two films and also between film 12 and the hot roll 14. The water between the films prevents the entrapment of air between these components, which otherwise would cause cloudiness or poor clarity of the composite film. The water retained between the composite film 16 and the hot roll 14 acts as release agent preventing sticking of the film to the hot roll.

Through contact with pool 15, the films also absorb water, which is retained in the composite film and effects a significant increase in film durability, as well as a desirable reduction in curling tendency.

After being bonded at the roll nip, the composite film 16 is retained tightly wrapped against the surface of the hot roll 14 over more than half its periphery. The film product is then conducted over transfer roll 17 and formed into rolls at wind-up station 38.

The attainment of consistently excellent results will generally require the incorporation of conventional tension control means at some convenient location between the unwind station for each of the component films and the laminating station. In the apparatus illustrated in the drawing, the gravure roll 25, the hot roll 14 and the wind-up roll 38 are driven rolls. If desired, additional idle transfer rolls may be used, for example between rolls 17 and 38. It may at times be advantageous to apply the coating of polymeric adhesive as shown in FIG. 2 in a separate line, wherein the adhesive-coated film is wound in rolls after passing roll 32. Such film may then be unwound and fed to the laminating station via rolls such as 33 and 34. Other similar modifications may be made in the apparatus and procedure described above without departing from this invention.

The laminating process may be operated successfully at any desired rate ranging from about 50 to 800 feet per minute. Preferably, the process is operated at a rate of about 200 to 300 feet per minute. The resulting composite film product is characterized by sparkling clarity, excellent bond strength and improved physical properties as measured, for example, by stress flex, tumble, pendulum impact, elongation, moisture content and drop test performance ratings.

What is claimed is:

1. In the process of laminating a pair of flexible films at least one of which is provided with a thermoplastic polymeric coating, wherein said films are united to form a composite film by passage through the nip between a pair of heated horizontally disposed rolls, the steps comprising providing a pool of heated water above said nip, causing said films to pass downwardly through said pool with one of said films having both surfaces in contact with said pool, and the other of said films having one surface maintained in contact with one of said rolls during passage through said pool so that only one of its surfaces contacts said pool, and then advancing said composite film about one of said rolls while tightly wrapped thereto.

2. A process according to claim 1, wherein the said pool is heated to 180° F. to 212° F.

3. A process according to claim 1, wherein the said pool of heated water has a depth of one-quarter to three inches.

4. A process according to claim 1, wherein at least one of said films is a cellulosic base having a thermoplastic vinyl polymer coating.

5. A process according to claim 1, wherein at least one of said films is cellophane having a thermoplastic vinylidene chloride copolymer coating.

6. A process according to claim 1, wherein one of said films is a polyolefin.

7. A process according to claim 1, wherein one of said films is a cellulosic base having a thermoplastic vinylidene chloride copolymer coating and the other of said films is a vinyl polymer.

References Cited

UNITED STATES PATENTS

| | | | |
|---|---|---|---|
| 1,195,408 | 8/1916 | Smith | 156—550 |
| 2,432,575 | 12/1947 | King | 156—324 |
| 2,706,699 | 4/1955 | Planseon et al. | 156—324 |
| 2,734,009 | 2/1956 | Coffey | 156—550 |
| 3,037,868 | 6/1962 | Rosser | 156—550 |
| 3,230,130 | 1/1966 | Wilcox | 156—324 |
| 3,262,829 | 7/1966 | Conti | 156—324 |
| 3,322,593 | 5/1967 | Conti | 156—307 |
| 3,457,139 | 7/1969 | James | 156—324 |

CARL D. QUARFORTH, Primary Examiner

F. M. GITTES, Assistant Examiner

U.S. Cl. X.R.

156—286, 324, 550